United States Patent
Pecen et al.

(10) Patent No.: US 6,925,095 B2
(45) Date of Patent: Aug. 2, 2005

(54) METHOD AND APPARATUS FOR COMMUNICATION

(75) Inventors: Mark Pecen, Palatine, IL (US); Niels Peter Skov Andersen, Roskilde (DK); Michael Kotzin, Buffalo Grove, IL (US); Arnold Sheynman, Glenview, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/384,324

(22) Filed: Mar. 7, 2003

(65) Prior Publication Data

US 2003/0193969 A1 Oct. 16, 2003

Related U.S. Application Data

(60) Provisional application No. 60/373,047, filed on Apr. 16, 2002.

(51) Int. Cl.[7] .................................................. H04J 3/22
(52) U.S. Cl. ....................................................... 370/470
(58) Field of Search ................................. 370/331–332, 370/335–338, 341–350, 231–235, 458, 470; 455/450–453, 440–444, 448, 436–439

(56) References Cited

U.S. PATENT DOCUMENTS

| | | | |
|---|---|---|---|
| 5,978,679 A | 11/1999 | Agre | 455/442 |
| 6,014,567 A | 1/2000 | Budka | 455/453 |
| 6,122,270 A | 9/2000 | Whinnett et al. | 370/342 |
| 6,469,995 B1 | 10/2002 | Voyer et al. | 370/331 |
| 6,597,679 B1 | 7/2003 | Willars | 370/342 |

OTHER PUBLICATIONS

Gustafsson, M.; Jamal, K.; Dahlman, E.; "Compressed mode techniques for inter–frequency measurements in a wide–band DS–CDMA system". Personal, Indoor and Mobile Radio Communications, 1997. PIMRC '97. The 8th IEEE International Symposium on Sep. 1–4, 1997.

Baier, A.; Panzer, H.; "Multi–rate DS–CDMA radio interface for third–generation cellular systems". Mobile and Personal Communications, 1993. Seventh IEE European Conference on Dec. 13–15, 1993, pp. 255–260.

Baker, M.P.J.; Mouslsley, T.J.; "Power control in UMTS Release '99". 3G Mobile Communication Technologies, 2000. First International Conference on (IEE Conf. Publ. No. 471) Mar. 27–29, 2000, pp. 36–40.

*Primary Examiner*—Chi Pham
*Assistant Examiner*—Thai Hoang
(74) *Attorney, Agent, or Firm*—Randall S. Vaas (57) ABSTRACT

A method of compressed mode communications permits evaluation of one communication network while communicating in another communication network. User equipment devices (108, 110) are assigned to different portions of a frame during compressed mode.

3 Claims, 13 Drawing Sheets

METHOD AND APPARATUS FOR COMMUNICATION

RELATED APPLICATION

This application claims the benefit of U.S. Provisional Application No. 60/373,047, filed Apr. 16, 2002.

FIELD OF THE INVENTION

The present invention pertains to framed signaling, and more particularly to a method and apparatus utilizing compressed mode operation for framed signals.

BACKGROUND OF THE INVENTION

Third generation wireless mobile user equipment will support dual radio access technology, such as by supporting communication over 3G (third generation) networks, such as wideband code division multiple access (WCDMA) networks, and 2G networks, such as Global Systems for Mobile communication (GSM) networks. Such user equipment will be required to acquire and maintain knowledge of multiple radio frequency domains with regard to signal strength of serving and adjacent cells, interference, and synchronization. When such user equipment is operating in idle mode, which is the mode in which the user equipment is not engaged in dedicated communication with a serving cell, the implementation of such procedures is straightforward.

However, where the user equipment is engaged in dedicated communication on a serving cell of one network, or domain, requiring that it both receive and transmit signals over the traffic channel, there may be a lack of time available during which measurements or synchronization of the other networks, or domains, supported by the equipment can take place. For example, if user equipment is engaged in dedicated communication with a serving cell on the Universal Terrestrial Radio Access (UTRA) domain using frequency division duplex (FDD), the user equipment must transmit during each available frame period. This effectively reduces to zero the time available for performing measuring and synchronization with a cell of a GSM network.

To overcome this problem, third generation partnership project (3 GPP) specification section 25.212 specifies "compressed mode" operation, during which the mobile user equipment, or the network, may transmit during only a portion of a frame in order to allow measurement and/or synchronization during the other portion of the frame. However, this specification requires transmissions to be performed using a smaller spreading factor, thereby necessitating a 3 dB greater transmission power to achieve a suitable bit-error rate (BER). The specified method thus severely impacts the capacity of the cell, as the number of devices operating in compressed mode will be limited by the increased power requirements.

The 3 GPP specification describes three methods for reducing the duration of transmitted signals communicated on one domain to thereby create a transmission gap enabling the mobile terminal to receive and perform measurements and/or synchronization activities on another domain. Puncturing, by which data redundancy is removed for a compressed frame to allow transmission within a shorter time period. This technique allows more data to be transmitted at the expense of error correction capability. A second technique is spreading factor reduction, by which the spreading factor is reduced by a factor of 2, thereby requiring half the time to transmit a given amount of data. However, such a reduction is at the expense of processing gain, which is applicable to both the uplink and the downlink. A third method of reducing the signal length is higher layer scheduling. These three methods are examples of compressed mode operation.

What is needed is an improved compressed mode communication.

BRIEF DESCRIPTION OF THE DRAWINGS

The various aspects, features and advantages of the present invention will become more fully apparent from the following Detailed Description with the accompanying drawings described below.

DETAILED DESCRIPTION OF THE DRAWINGS

A complementary compressed mode method and apparatus facilitate evaluation of one communication network while communicating in another communication network. User equipment devices (108, 110) are assigned to different portions of a frame during compressed mode operation.

Figure 1:
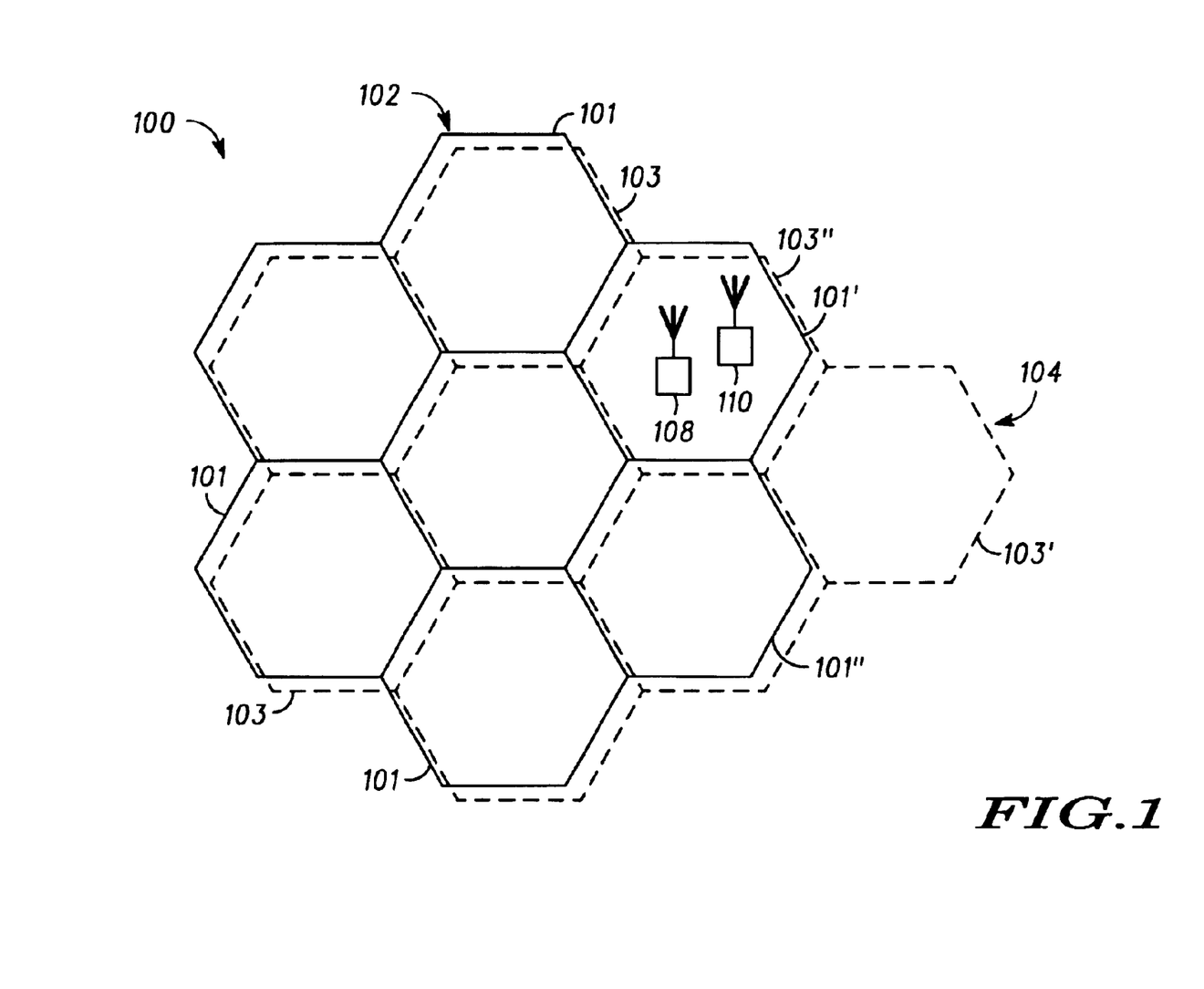
FIG. 1 is schematic representation of a cellular communication system having different overlapping networks, or domains.

A cellular communication system 100 (FIG. 1) is illustrated including a first communication network 102 covering a plurality of cells 101 (only some of which are numbered). By way of example, each cell can be considered to represent the coverage area of a base station. The first network may for example be a UTRA network, and in particular either a UTRA FDD or UTRA time division duplex (TDD) network. The communication system 100 also includes a second communication network 104 covering a plurality of cells 103 (only some of which are numbered), each cell representing the coverage area of a base station. The second network may for example be a Global System for Mobile communication (GSM) or a second-generation (2 G) code division multiple access (CDMA) network. The cellular communication system 100 may include additional or other communication networks, as the communication networks may operate according to any known wireless communication system specification protocol, such as GSM, CDMA, wideband code division multiple access (WCDMA), time division multiple access (TDMA), General Packet Radio System (GPRS), Enhance Data for Global Evolution (EDGE), or the like. The user equipment 108, or user equipment device, may be a cellular radiotelephone, a personal digital assistant, a modem, an accessory, or the like, and may support either single mode or multimode operation, and thus may be capable of operating in one or more than one communication protocol and/or one or more than one frequency band.

Figure 2:
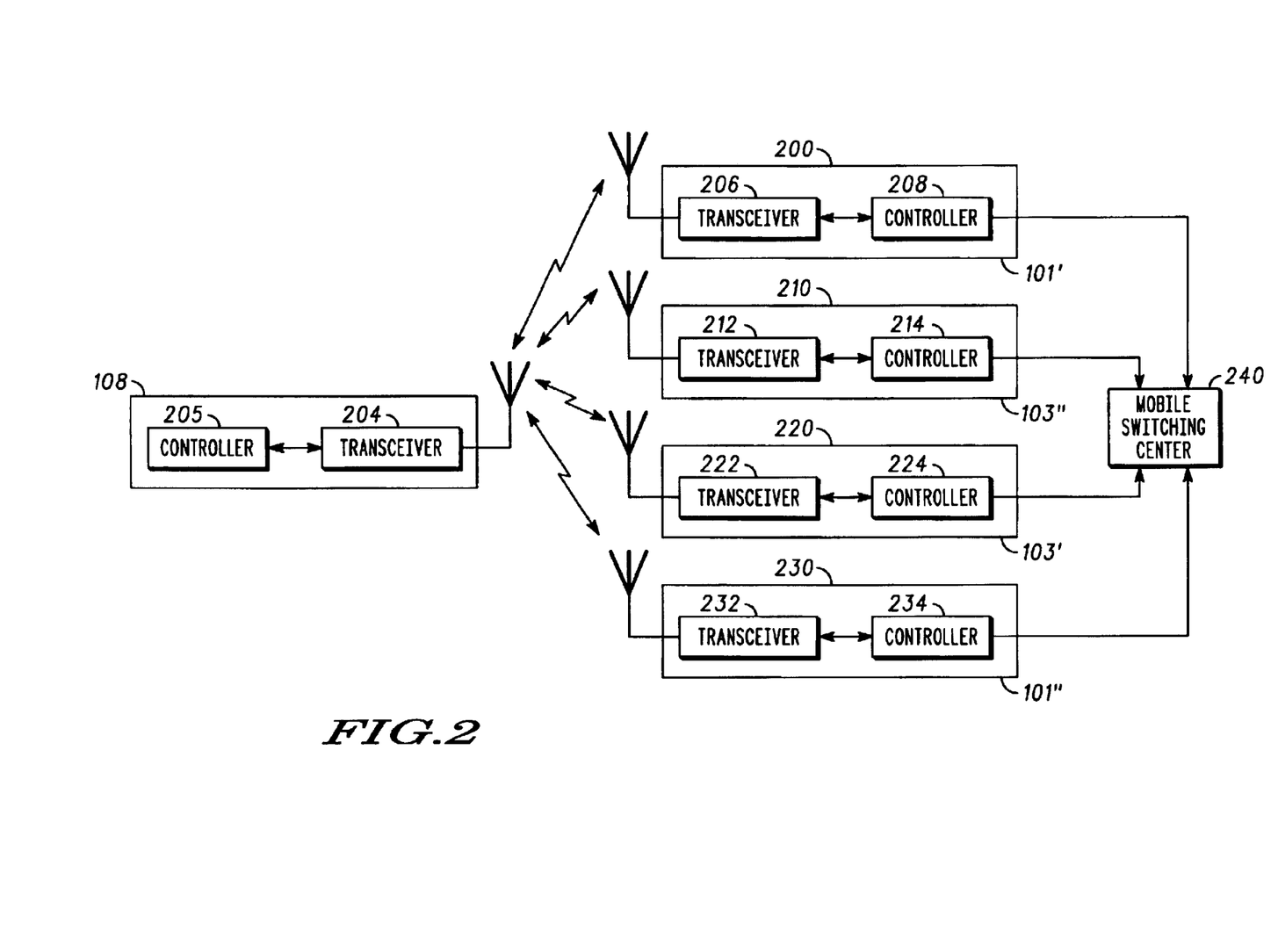
FIG. 2 is a circuit schematic in block diagram form illustrating user equipment and four base stations.

The user equipment 108 includes transceiver 204 (FIG. 2) and a controller 205. In general, the transceiver 204 enables the user equipment to effect a wireless communication link with base stations, such as base station 200 of cell 101', base station 230 of cell 101", base station 210 of cell 103", and base station 220 of cell 103'. Each base station includes a transceiver 206, 212, 222, 232, for wireless communication and a controller 208, 214, 224, 234 for controlling the operation of the base station and establishing a communication link with the mobile switching center 240. The mobile base stations (e.g., 200, 210, 220, 230) and the mobile switching center 240 are part of a system supporting wireless communications. As illustrated herein, networks 102 and 104 each refer to respective cells having a common communication protocol, and multiple such networks make up the communication system 100 generally covering a common geographical area. The networks may have a common operator, also known as a carrier, or different operators.

In operation, as the user equipment 108, 110 (FIG. 1) moves through the cellular communication system 100, hand-off will occur according to ordinary operating techniques, which are well known in the art. For multi-mode user equipment, such as those operating over a plurality of different communication air interfaces, the user equipment 108, 110 will be required to acquire and maintain knowledge of multiple radio frequency domains, and may for example maintain knowledge of signal strength of serving and adjacent cells, interference information, and synchronization information, as is known to those of ordinary skill in the art.

While the user equipment 108, 110 (FIG. 1) establishes a dedicated communication link with a base in the first communication network 102, which is illustrated as a UTRA network, the user equipment will at least occasionally be required to evaluate the second communication network 104, illustrated as a GSM network. This may for example occur when the user equipment 108 moves to the edge of cell 101', 101" adjacent cell 103'. In the illustrated embodiment, cell 103' covers an area not served by communication network 102, and thus user equipment 108 will need to be handed off from base station 200 to base station 220. In order to support the measurement and synchronization processes that user equipment 108 must perform while engaged in communications with base station 200 of cell 101', at least the uplink communications between the user equipment 108 and base station 200 are made in compressed mode.

Figure 3:
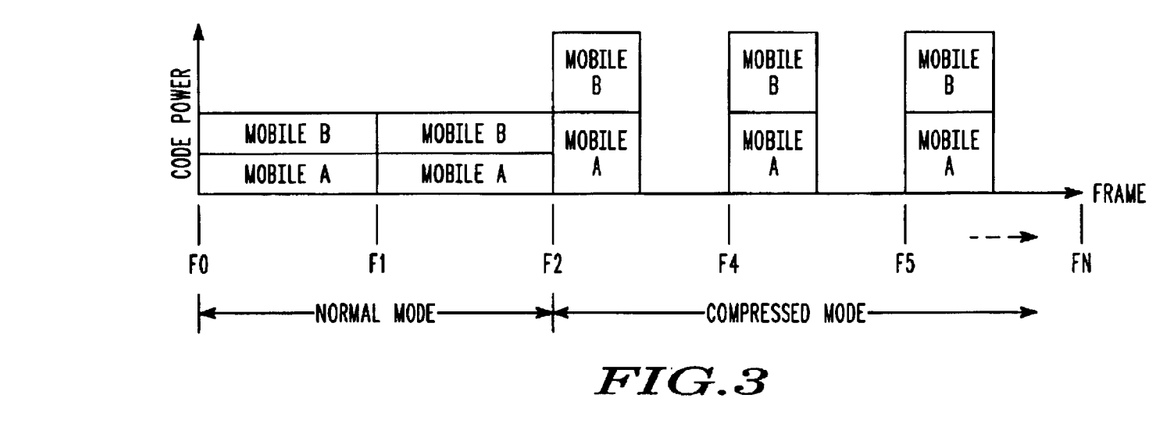
FIG. 3 illustrates a compressed mode frame allocation.

More particularly, the user equipment 108 (FIG. 1) will be required to obtain knowledge of multiple radio frequency domains, and attend to inter-domain measurement and/or synchronization tasks for the second communication network 104, while user equipment 108 has an established link with communication network 102. In compressed mode, these tasks are performed during a time period when the user equipment 108 is engaged in dedicated communications with communications network 102, but during which dedicated communication, a temporal gap is created between uplink transmissions, affording the mobile terminal to perform measurements and synchronization activities on network 104. One timing diagram for accomplishing this is illustrated in FIG. 3, showing timing for user equipment 108, 110, referred to in this figure as Mobile A (108) and Mobile B (110). In compressed mode Mobile A and Mobile B both transmit with a reduced spreading factor, and higher power, such that communications with one network (e.g., base station 200) occur in the first half of the frame. During the second half of the frame, Mobile A and Mobile B may evaluate the other network. Evaluation may for example comprise making inter domain measurements, obtaining synchronization with the other network, or another network evaluation (e.g., base station 220).

Thus, in compressed mode, a transmission gap is created during which the user equipment may perform measurements without encountering a scheduling conflict. A scheduling conflict would otherwise occur where the user equipment attempts to perform two tasks simultaneously with a single transceiver path. Additionally, compressed mode occurs without subjecting the system to prohibitively high levels of self-interference, as in the case of inter-mode measurements that may occur at the same time in the same or a close frequency band.

In normal mode, the CDMA signals from user equipment 108, 110 (FIG. 1) are separated from one another by a channel identification code on the uplink. The signals in the downlink are also separated by a channel identification code. During compressed mode, the channel identification code (e.g., an orthogonal code in CDMA) still isolates the signals, but the information rate is effectively "sped up" by a factor of 2 in response to the spreading factor being reduced by ½. It is necessary to increase uplink power for the user equipment 108, 110 in compressed mode to compensate for the loss of processing gain due to the lower spreading factor. A significant problem encountered with a network operating according to FIG. 3 is the number of user equipment devices that can operate in compressed mode is severely limited.

As used herein, in a "compressed mode pattern," a certain number of frames having transmission gaps are followed by a certain number of frames that do not have transmission gaps, and this pattern repeats with a periodicity of a certain number of frames. A compressed mode pattern thus describes: the number of time slots during which transmission occurs within the period of a given frame; the number of time slots during which compression does not occur within the period of a given frame; the number of compressed frames in which compressed transmissions occur during time slots of a given frame; and the number of non-compressed frames in which compressed transmission does not occur during the time slots of a given frame.

Figure 14:
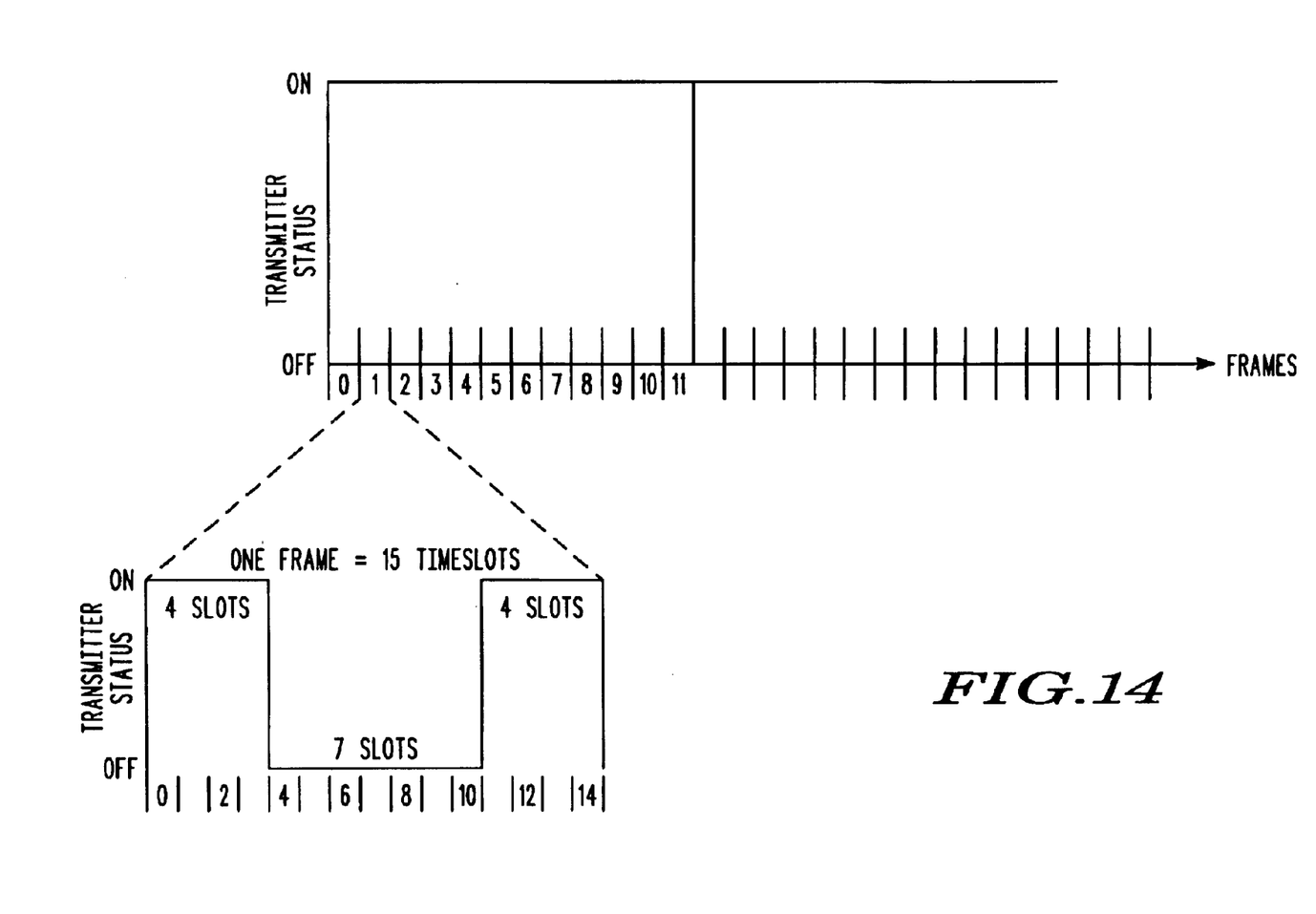
FIG. 14 illustrates a compressed mode pattern.

An example of a transmission pattern is illustrated in FIG. 14. The illustrated pattern comprises 12 frames, 2 compressed frames followed by 10 non-compressed frames. Within the compressed frames, there are 15 slots, the first 4 and last 4 of which are available for transmission and the middle 7 of which the transmitter is turned off. Those skilled in the art will recognize that many other transmission patterns are possible.

Figure 4:
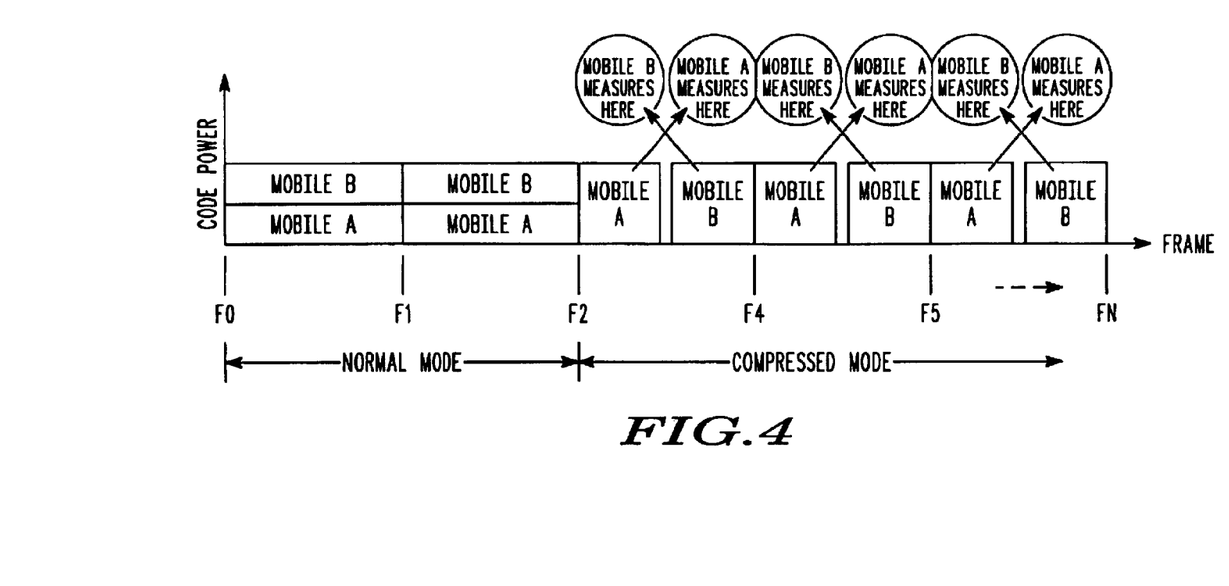
FIG. 4 illustrates an improved compressed mode frame allocation.

A significantly improved method for compressed mode operation is illustrated in FIG. 4. In FIG. 4, Mobile A (108 in FIG. 1) communicates in the first portion of the frame and Mobile B (110 in FIG. 1) communicates in the second portion of the frame. While Mobile A communicates with one base station 200 of cell 101' of the first communication network 102, Mobile B performs inter-domain measurement and/or synchronization with base station 220 of cell 103'. In the second portion of the frame, Mobile B communicates with a base station 200 and Mobile A performs inter-domain measurement and/or synchronization. The compressed mode continues for N frames, where N is an integer. N can be any number greater than 0, and may for example be 2, such that measurements may be made in 2 consecutive frames followed by 10 frames that are not compressed, thereby providing a 12-frame pattern. Although two user equipment devices are illustrated, more than two user equipment devices can be allocated to each of the first portion and the second portion of the frame, each of the user equipment devices having a respective orthogonal code, and because all of the user equipment is not communicating within the same portion of the frame, the number of devices that can operate in compressed mode is significantly increased.

Although the first portion and the second portion may be allocated from many different groups of slots, one frame pattern envisioned divides the frame into fifteen slots. The first portion comprises the first seven slots that are allocated to a plurality of devices separated by orthogonal codes. The second portion comprises the last seven slots that are allocated to another group of devices, also separated by orthogonal codes. The third portion is a separation slot in the middle of a frame. In one embodiment, it is envisioned that the devices allocated to the first portion will have different orthogonal codes than the devices in the second portion. The fifteen slots are preferably of equal length.

To examine the effects of amplitude variations based on the type of pattern (on/off sequence) selected, a simulation was used to generate various compressed mode patterns in terms of the radio frequency (RF) envelope shape, and then a Fourier transform was used to determine the spectral properties of the envelope. The 7-1-7 slot compressed mode pattern was found to have favorable spectral characteristics when compared to other patterns when user equipment were paired.

In particular, Fourier analysis was used to compute the spectrum of the RF envelope having the maximum allowable rise time and a decay time of 25 $\mu$s. The simulation used compressed mode patterns, each of which had a repetition period of 12 frames, i.e. 2 compressed frames followed by 10 uncompressed frames, which pattern was repeated. The inventors found a significant degree of cancellation of spectral components under 100 Hz (frequency number approximately 125) for the 7-1-7 pattern. While there are many other combinations of patterns that may be compared and utilized with the invention, the 7-1-7 pattern using a repetition period of 12 frames resulted in lower uplink interference.

Figure 5:
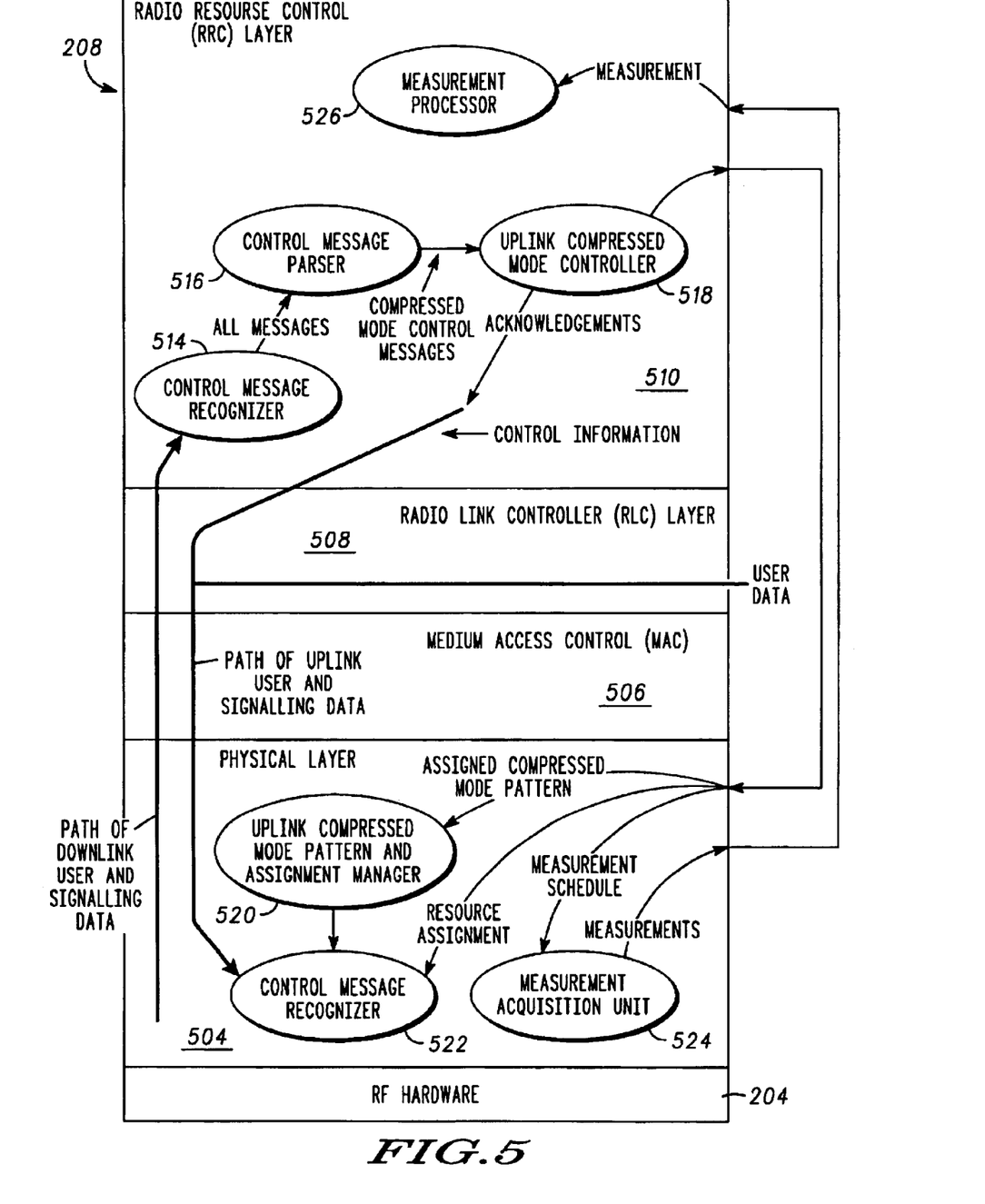
FIG. 5 illustrates user equipment operable in compressed mode.

The user equipment 108 will now be described in greater detail with reference to FIG. 5. The user equipment includes transceiver 204, which may be implemented using any suitable wireless transceiver known in the art. The controller 205 includes a physical layer 504, a medium access control (MAC) layer 506, a radio link controller (RLC) layer 508, and a radio resource control (RRC) layer 510. The physical layer 504 maps the transport channels to physical channels and exchanges coded and modulated baseband signals with the RF transceiver. The channels may be identified by frequency, code (such as in a CDMA network) or time (such as in a TDMA network), or by any two or more of frequency, time and code.

The MAC layer 506 maps logical channels from the RLC 508 to transport channels in the physical layer. The RLC 508 controls the transmission link over the radio medium.

The RRC layer 510 controls radio operation of the user equipment 108 (or 110). RRC layer 510 includes a control message recognizer 514, which outputs downlink messages to the control message parser 516. Compressed mode control messages are input to the uplink compressed mode controller 518. The compressed mode controller generates message acknowledgements, which are input to the uplink user data path for communication to the base station with which the user equipment 108 is communicating. The uplink compressed mode controller also generates compressed mode control information, pattern assignment information, and resource assignment and measurement scheduling, which is determined as described in greater detail hereinbelow and provided to the physical layer 504. The physical layer includes an uplink compressed mode pattern and assignment manager 520 responsive to the compressed mode pattern received from the uplink compressed mode controller 518. An uplink transmission controller 522 communicates via the radio frequency transceiver 204 under the control of resource assignments received from the uplink compressed mode controller 518. The physical layer further includes a measurement acquisition unit 524, responsive to the measurement schedule from the uplink compressed mode controller 518 for acquiring measurements and communicating the measurements to the measurement processor 526 in the radio resource controller 510.

Figure 6:
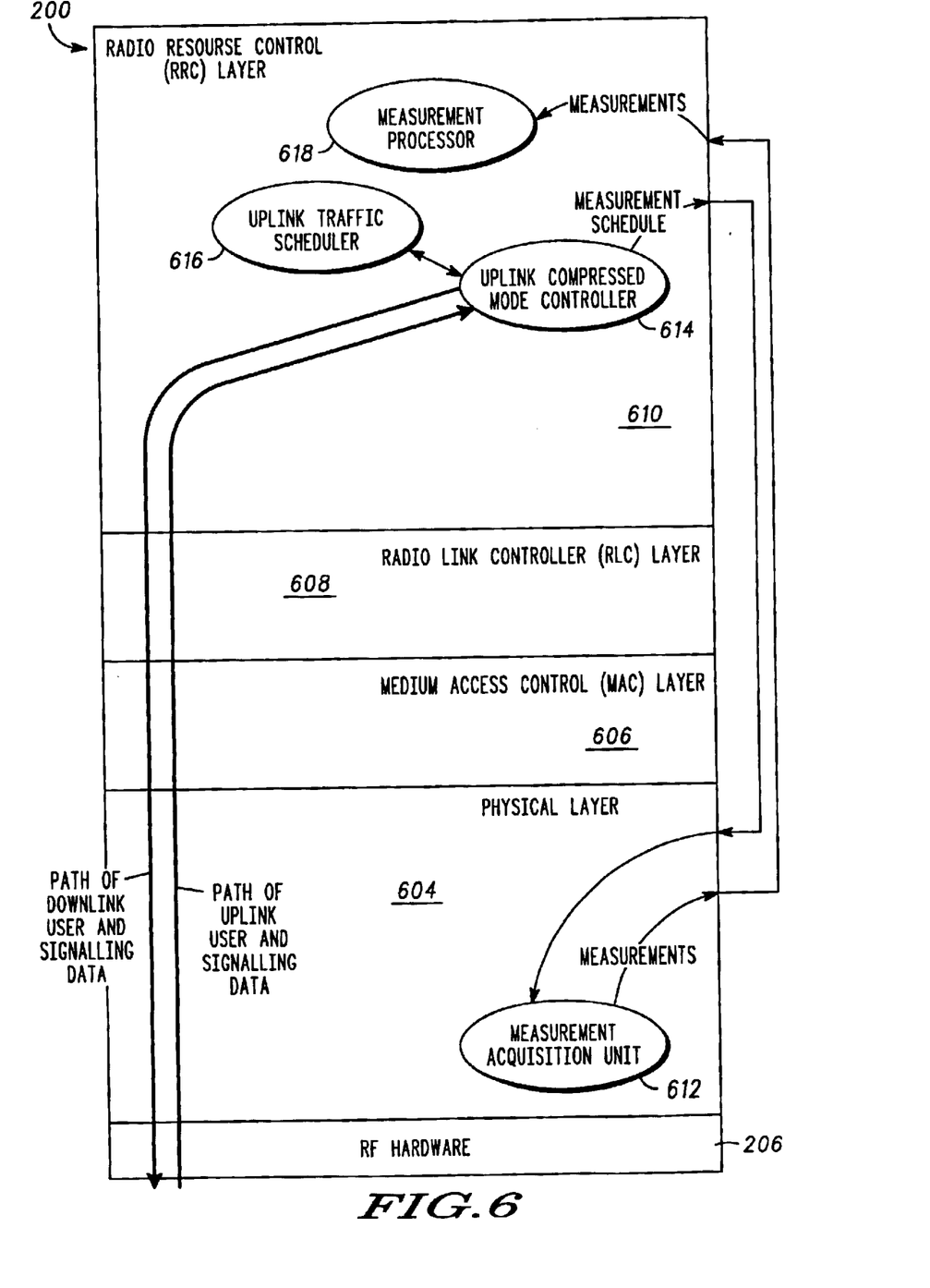
FIG. 6 illustrates a base station operable in compressed mode.

FIG. 6 illustrates the base stations in cellular communication system 100, and is represented herein by base station 200 (210, 220, 230). The base station 200 includes RF transceiver 206. The controller 208 includes a physical layer 604, MAC 606, RLC layer 608, and RRC layer 610. The physical layer maps transport channels to basic physical channels, and generates coded and modulated baseband signals. The MAC layer maps logical channels to transport channels. The RLC layer controls radio bearers or transmission links over the radio medium.

The RRC layer 610 controls radio resources. The RRC includes an uplink compressed mode controller 614, which receives downlink signal data and generates uplink signal data. The compressed mode controller communicates with the uplink traffic scheduler 616. Additionally, the uplink compressed mode controller communicates the measurement schedule to the measurement acquisition unit 612. A measurement processor 618 receives the measurements from the measurement acquisition unit 612.

Figure 7:
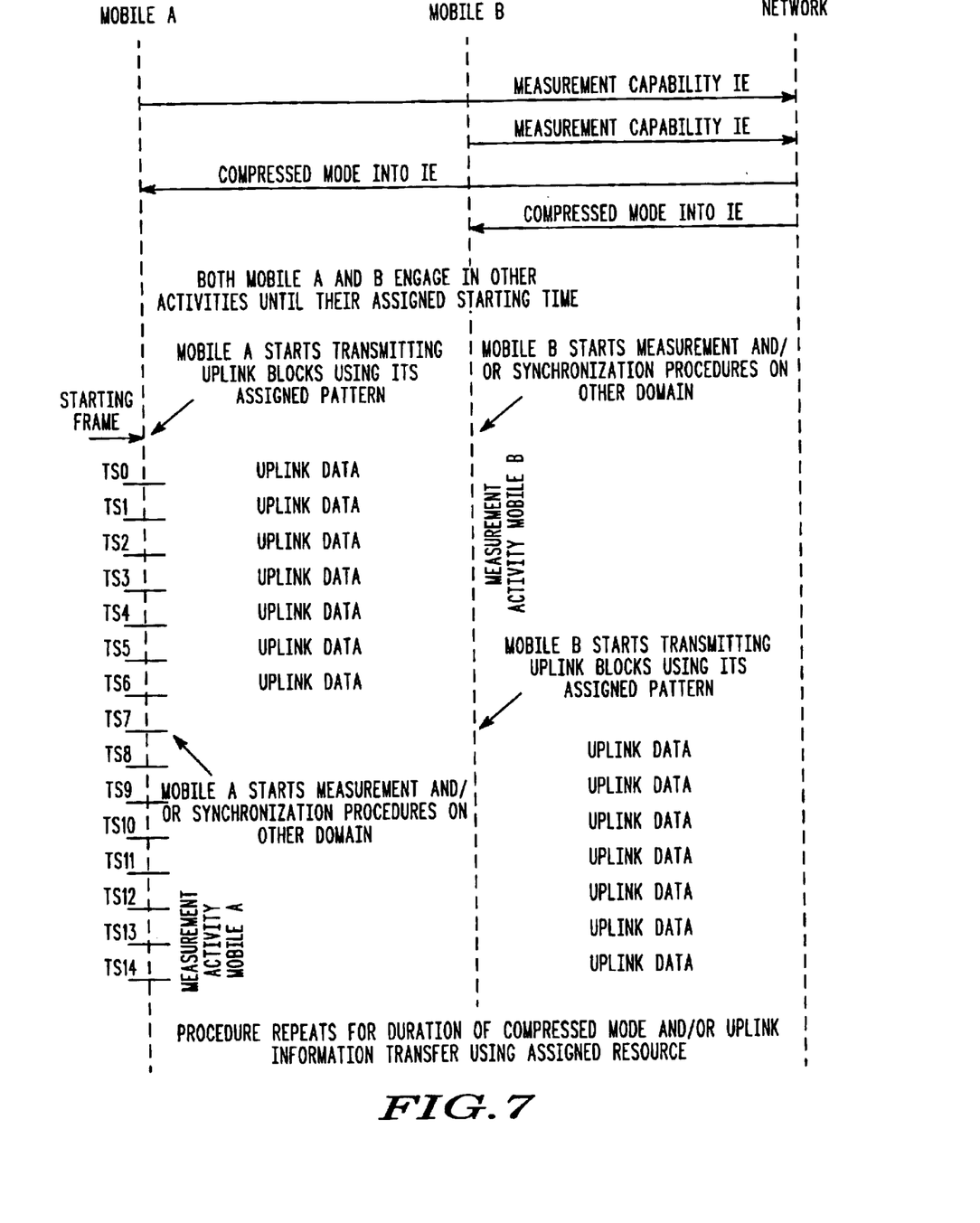
FIG. 7 illustrates signal flow between user equipment and a base station.

The operation of the system will now be described with reference to FIG. 7. Initially, the user equipment devices 108, 110, (represented by Mobile A and Mobile B) each send a message containing a measurement capability information element to the network (base station 200). The information element may be part of multiple messages, and contain the need, purpose and direction for the type of compressed mode of which the mobile is capable. When the RRC layer 610 (FIG. 6) is making an assignment of radio resources to user equipment being scheduled for uplink transmission, the uplink compressed mode controller 614 in the network RRC 610 chooses pairs of user equipment devices and assigns them complementary patterns and the same starting frame number. The characteristics of the uplink compressed mode are sent in an assignment message containing the compressed mode information element (IE) which includes: compressed mode pattern; starting frame number; starting timeslot within frame; pattern period; and the maximum number of repetitions. In the example of FIG. 4, Mobile A will be assigned to transmit in timeslots TS0–TS6 and Mobile B will be assigned to timeslots TS8–TS14. Thereafter, Mobile A and Mobile B transmit uplink blocks using their respective assigned communication slots in the current communication domain (e.g., first communication network 102) and measure and/or synchronize on the other communication domain (e.g., second communication network 104) using the paired devices assigned communication slots. The procedure repeats for the duration of the frames indicated.

Figure 9:
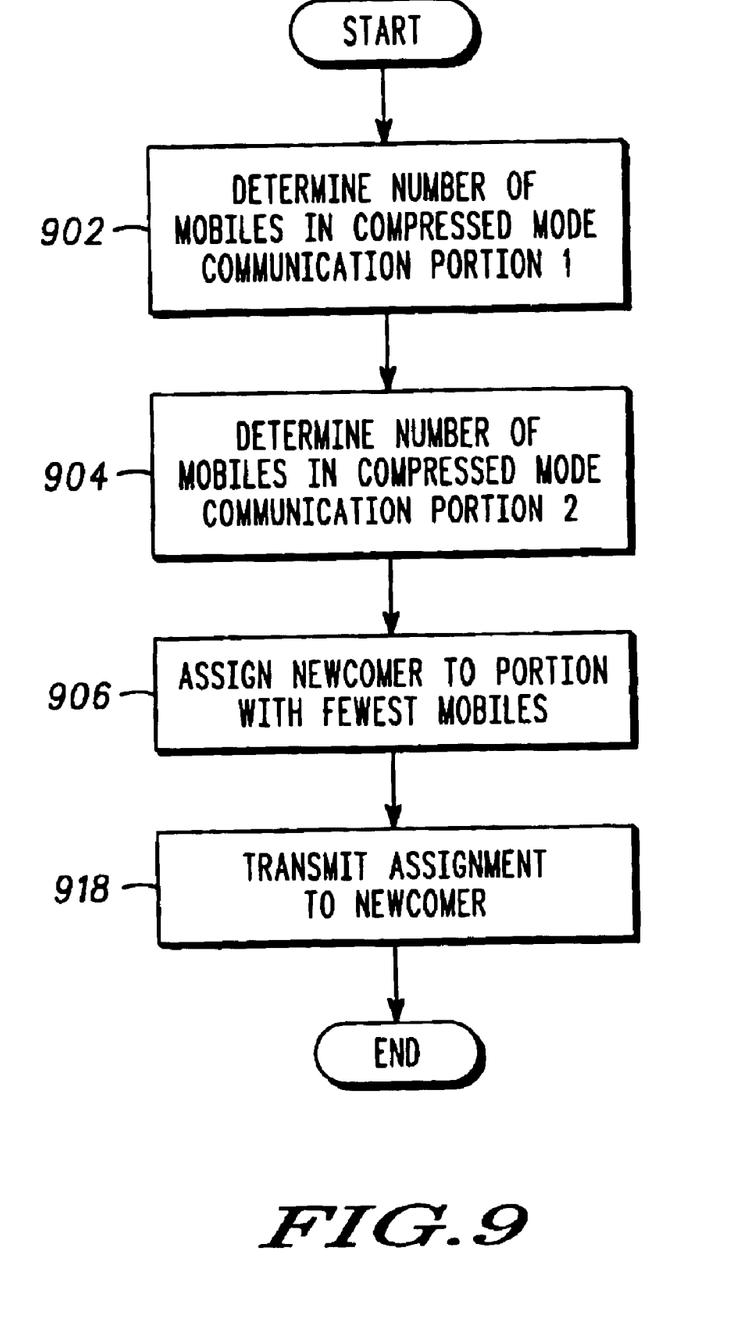
FIG. 9 is a flow diagram illustrating operation of a base station to assign portions of a frame for compressed mode communication.

FIG. 9 illustrates operation of the base station of network 102 to assign time slots according to one embodiment. In particular, as user equipment 108, 110 is added to compressed mode, the network first determines how many user equipment devices on communication network 102 are operating in compressed mode and transmitting in portion 1 of the frame (e.g., time slots TS0–TS6) for frames 1 and 2, as indicated in step 902. The network then determines how many user equipment devices on communication network 102 are operating in compressed mode and communicating in the second portion of the frame (e.g., time slots TS8–TS14) for frames 1 and 2, as indicated in step 904. The newest addition to compressed mode operation in frames 1 and 2 is then assigned by the network to the time slots having the smallest number of user equipment devices operating in compressed mode, as indicated in step 906. The assignment is stored in the network and communicated to the user equipment in step 908. In this manner, the newest addition to communication network 102 is always added to the portion of the frame having the fewest active devices.

Figure 10:
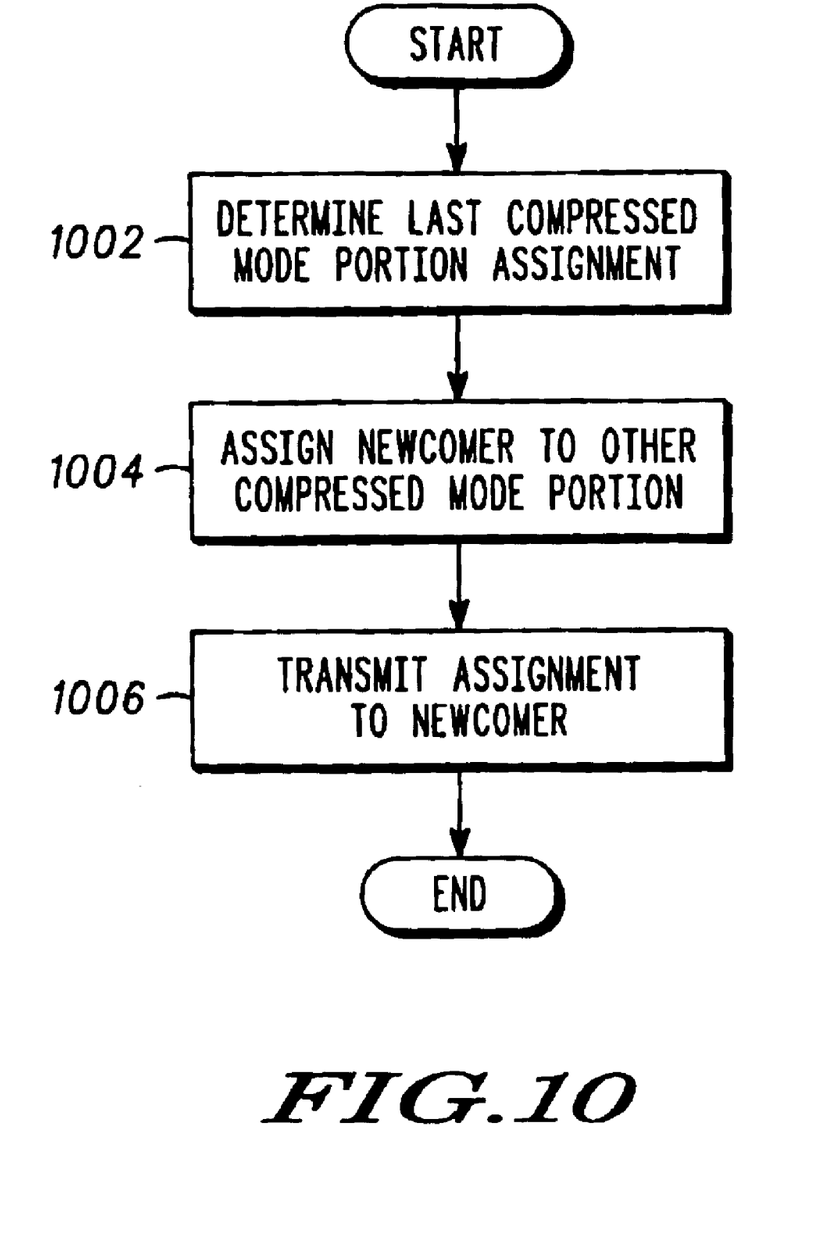
FIG. 10 is a flow diagram illustrating an alternate operation of a base station to assign portions of a frame for compressed mode communication.

An alternate embodiment is illustrated in FIG. 10. In this embodiment, when the subscriber equipment 108, 110 initiates compressed mode operation on an active communication network (for example communication network 102), the network (communication network 102) determines in step 1002 to which portion (e.g., time slots TS0–TS6 or time slots TS8–TS14) the user equipment that last initiated compressed mode operation in the same frames was assigned in step 1004. The network assigns the new user equipment device to the other portion of the frames, in step 1006. Thus, by way of example the communication network 102 alternates the portions (slots) assigned to user devices as they are added to a common frame for operation on communication network 102.

Figure 11:
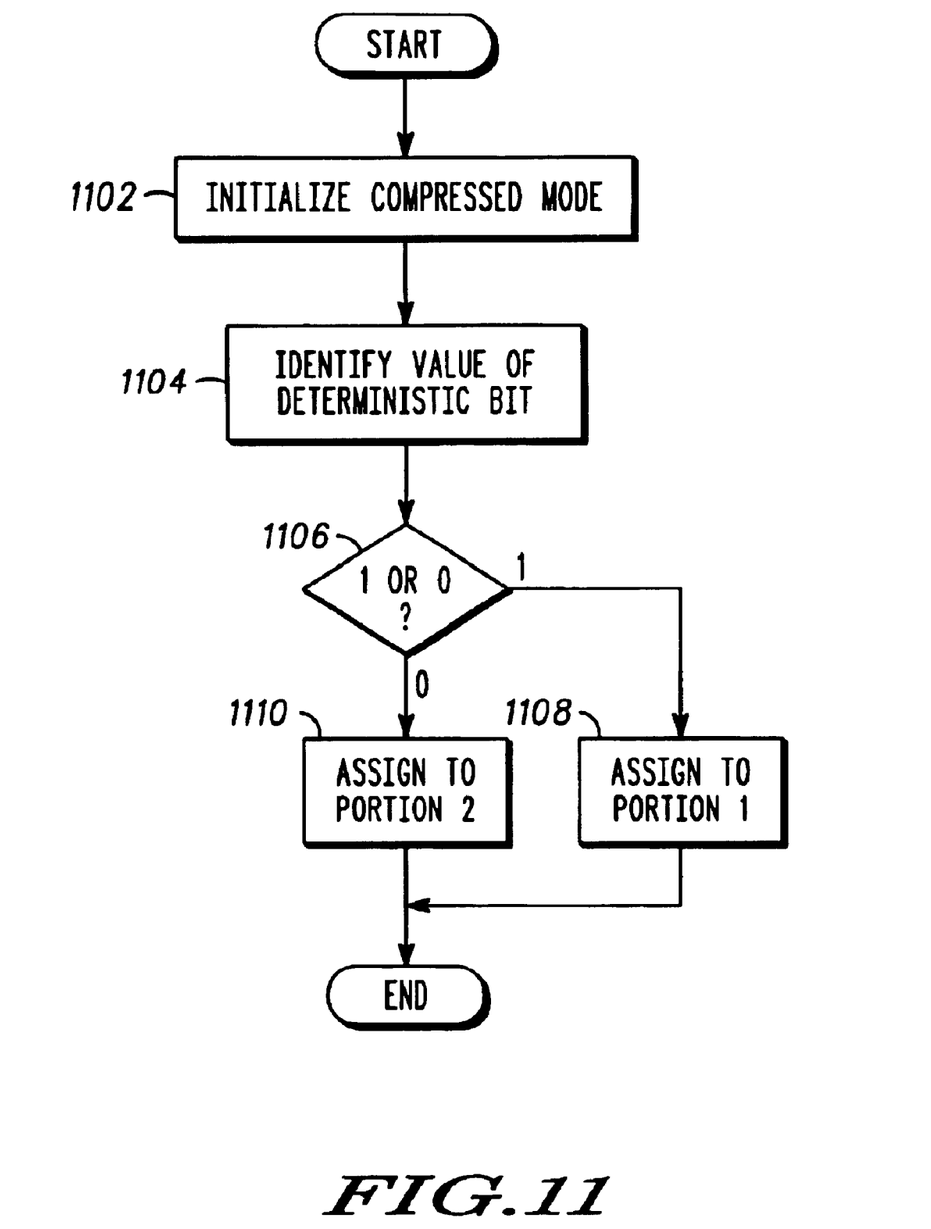
FIG. 11 is a flow diagram illustrating operation of user equipment and base station to allocate the portion of the frame for compressed mode communication.

Yet another alternate embodiment for assigning compressed mode operation is illustrated in FIG. 11. In FIG. 11, both the network and the user equipment operation is described, as in this embodiment the assignment is not made at the network, but rather the user equipment and the base station both determine the compressed mode slots for the user equipment using a deterministic value known to both the user equipment device and the base station. Thus, in this embodiment, a predetermined deterministic value known to both the user equipment and the network selects the portion of the frame to which the user equipment is assigned. In particular, compressed mode operation is initiated in step 1102. The deterministic value is checked in step 1104. If the deterministic value is a 1, the user device will conduct compressed mode operation in portion 1 of the time slot, as indicated in step 1108. If 0, as determined in step 1106, the compressed mode communication will take place in the second portion of the frame, and measurements will be made in the first portion of the frame, as indicated in step 1110.

It is envisioned that the deterministic value may be any value known to the user equipment and the base station, and may for example be a particular bit of the subscriber international mobile equipment identity (IMEI), such as the last bit of the subscriber equipment IMEI. An alternative deterministic value could be a predetermined bit of a signal communicated from the user equipment to the network, such as a bit stored in memory in the user equipment. Another alternative can be a random or pseudo-random number generated by circuitry in the user equipment and known to the base station with which the user device is communicating.

Figure 8:
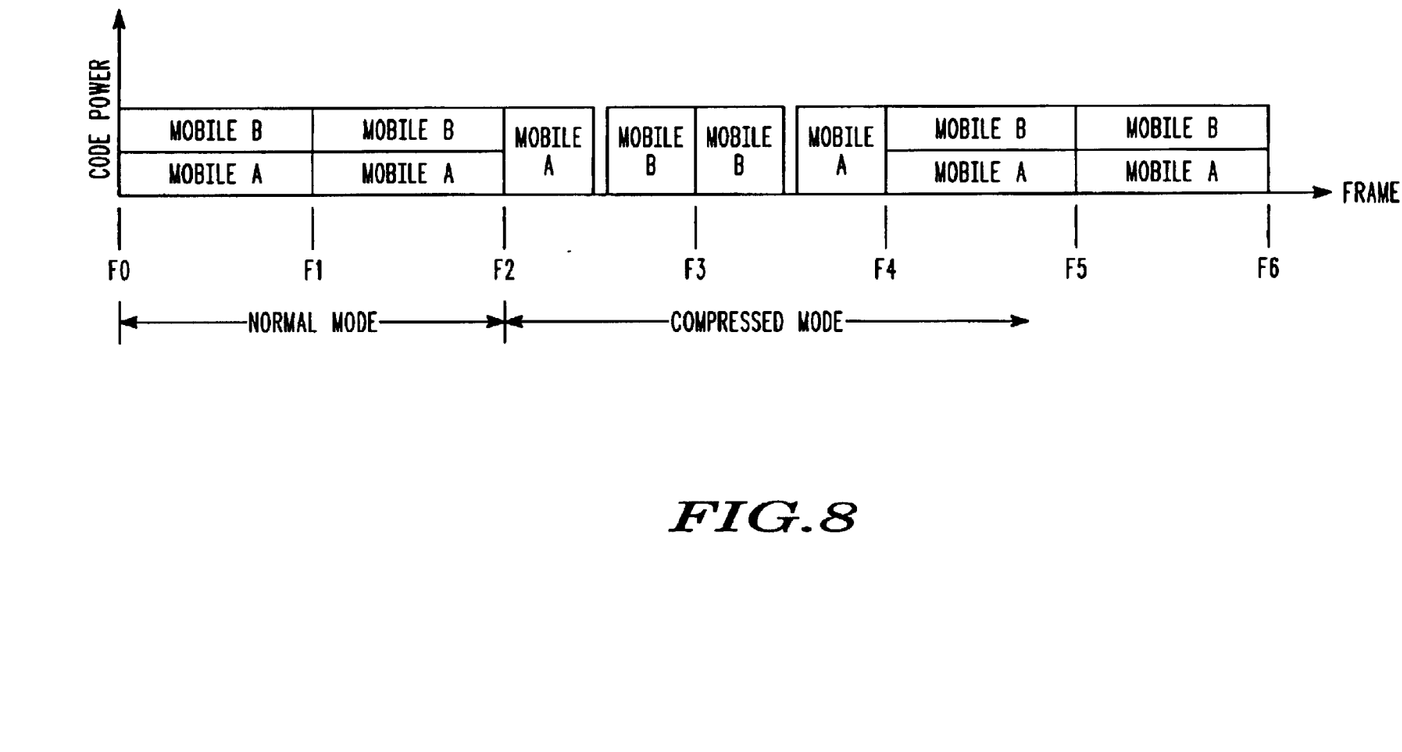
FIG. 8 illustrates another improved compressed mode frame allocation.

FIG. 8 illustrates an alternate frame allocation embodiment. In the embodiment of FIG. 8, the user equipment slot assignments vary from frame to frame. Thus, in frame 2 (F2), Mobile A is transmits in the first portion and Mobile B transmits in the second portion. In frame 3 (F3), Mobile B transmits in the first portion and Mobile A transmits in the second portion. In the illustrated example, Mobile A and Mobile B always transmit in different portions of the frame. However, those skilled in the art will recognize that the assignments for each of Mobile A and Mobile B may advantageously be random, or pseudo random, such that in some frames Mobile A and Mobile B will communicate on one network and measure in the other network during the same time slots (portion) of a frame. Those skilled in the art will also recognize that there will be more than two user equipment devices operating on the network, such that many other devices are transmitting in each of the first and second portions of the frame. It is envisioned that the compressed modes illustrated in this application can apply to networks operating at capacity, with all the user equipment devices operating in compressed mode.

Figure 12:
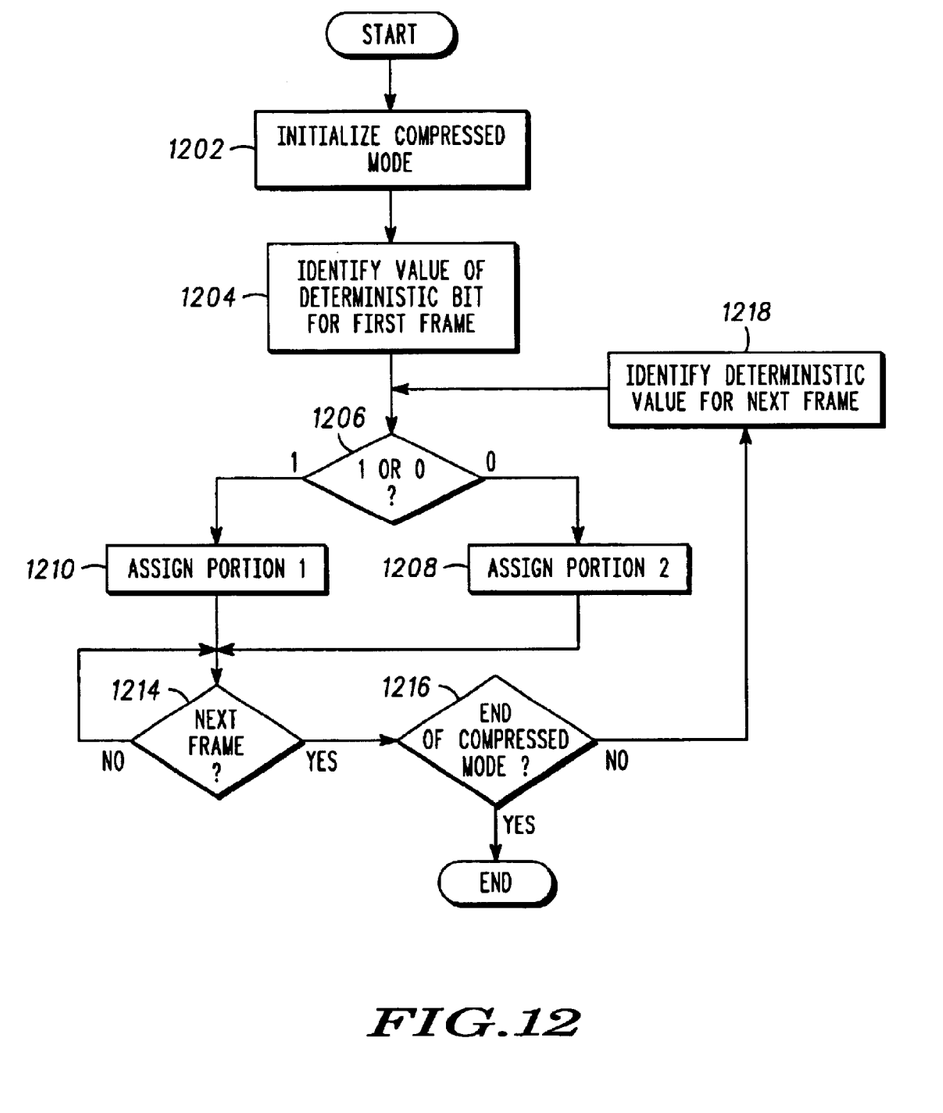
FIG. 12 is a flow diagram illustrating an alternate operation of a user device and a base to allocate the portion of the frame for compressed mode communication.

FIG. 12 illustrates operation of the user equipment and base station, wherein each use a deterministic value to determine the frame portion for communication such that the base station need not determine and assign the value to the subscriber device, and providing the compressed mode frame allocation shown in FIG. 8. In FIG. 12, the portion assignment for communication with base station 200 will change in each frame in a pseudo-random manner. The compressed mode is initialized in step 1202. The deterministic value for the first frame is determined in step 1204. For example, the deterministic value can be based on the encryption key sequence that is generated for encrypting data in digital communication networks, which is a pseudo random number known to the user equipment device and base station, can be used as the basis for making the slot assignment for a user equipment device in a frame. Another alternative is for the user equipment device and the network to each use a predetermined bit of a synchronized linear shift register that steps through every number (or every number except all zeroes) as the deterministic value. For example, the least significant bit of the sequence selected to be the basis for the slot assignment can be used as the deterministic value.

In step 1206, the controllers in the user equipment and the base station determine whether the deterministic bit is a 1 or a 0. If the deterministic bit is a 0, then the communication in compressed mode will be in portion 2 for the initial frame as indicated in step 1208. If the deterministic bit is a 1, the communications in the compressed mode will use portion 1 for the initial frame, as indicated in step 1210. The controller waits for the next frame in step 1214. If the next frame is after the last frame of the compressed mode sequence, as determined in step 1216, the compressed mode communication ends. If the frame is not after the last frame of the compressed mode sequence, the controller identifies the deterministic value for the next frame in step 1218, and returns to decision step 1206. This process will be repeated for the compressed frames in the compression pattern until the last frame.

With complementary compressed mode, the uplinks are still processed by reducing their spreading factor by ½, except that instead of being isolated from one another by orthogonal codes, they are now temporally isolated in a manner of a slotted physical access mechanism. Additionally, compressed mode operation can be assigned to pairs of user equipment devices, each with a complementary pattern.

The present invention has significant technically and commercially desirable attributes. It reduces the peak-to-peak amplitude variations arriving at the Node-B receiver from a given pair of user equipments assigned to symmetrical compressed mode. This results in lower self-interference on the uplink, and therefore greater cell capacity. Additionally, a timeslot pattern and period can be selected that demonstrates surprising spectral characteristics for the RF envelope to be optimized.

Figure 13:
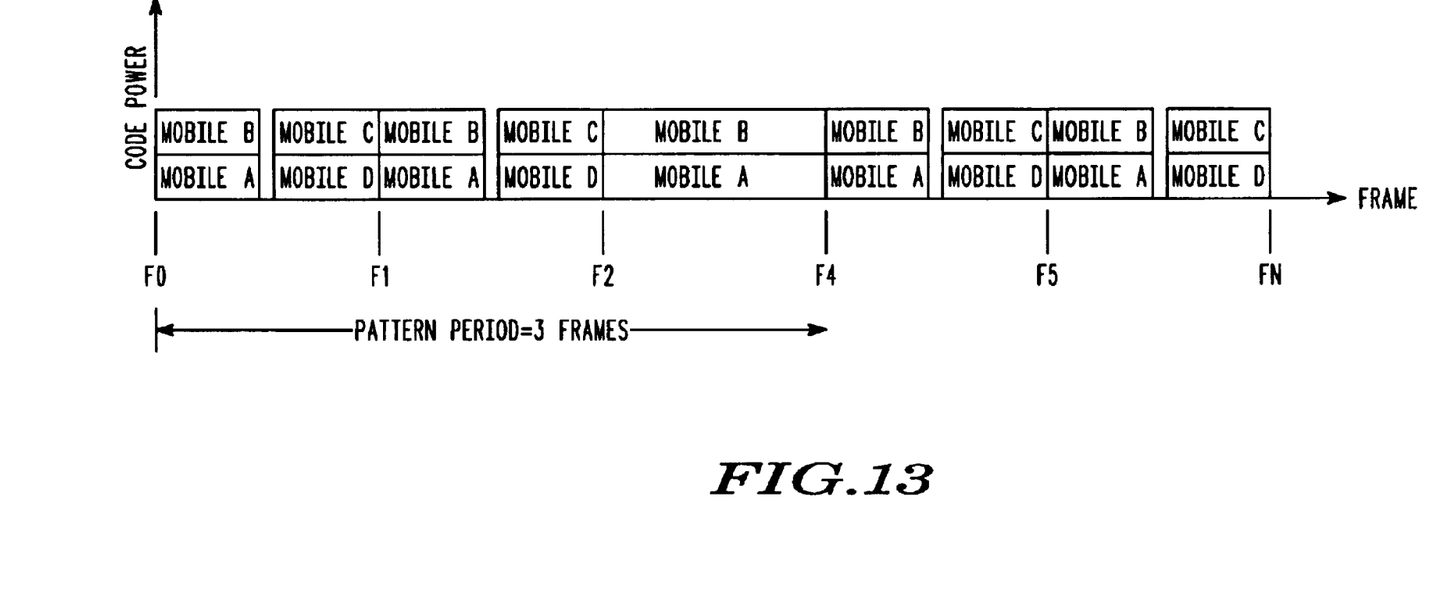
FIG. 13 illustrates another embodiment of a compressed mode frame allocation.

FIG. 13 illustrates a method wherein radio resource assignments are made for a universe of 4 user equipment devices that would previously have been allocated to 2. This is accomplished by assigning the same channel identification code, such as the spreading or orthogonal code of a CDMA network, to Mobile B and Mobile C, and another channel identification code to Mobile A and Mobile D. The user equipment operates in compressed mode under the control of the network to increase the capacity of the network, by assigning the same code to a pair of user equipment devices that operate within different portions of the frame. This assignment can be utilized in those frames where compressed mode is used as described herein above, and in networks where compressed mode is not utilized for measurement and synchronization activity on other domains. In both cases, the compressed mode is used to increase capacity for best-effort packet transmission by an amount approaching 66%. The 66% improvement is limited by a requirement that 1 of 3 frames be transmitted in a non-compressed manner. Thus, an intelligent algorithm permits user equipment devices to achieve a substantially higher capacity for best-effort packet transfer mode as more user equipment devices may be assigned to the same code and multiplexed in time as well as by code. It is expected to be especially useful in the case of a best effort packet data transmission where an intelligent complementary compressed mode scheduler would produce pairs of radio resource assignments and compressed mode patterns based on the radio resource availability as well as uplink signal quality. In this manner, multiple user equipment devices may share the same codes on the uplink.

While the present inventions have been described in a manner that enables those of ordinary skill in the art to make and use the inventions, it will be understood and appreciated that there are many equivalents to the exemplary embodiments disclosed herein, and that modifications and variations may be made without departing from the scope and spirit of the inventions, which are to be limited not by the exemplary embodiments but by the appended claims.

We claim:

1. A method of assigning measurement and transmission portions of a compressed frame of a framed communication system, the framed communication system including compressed and non-compressed frames, user equipment devices assigned to communicate in compressed and non-compressed frames, the method comprising the steps of:

determining the number of user equipment devices assigned to communicate in a first portion of a compressed frame;

determining the number of user equipment devices assigned to communicate in a second portion of the compressed frame; and newly assigning a user equipment device to communicate in the one of the first and second portions of the compressed frame having the fewest user equipment devices assigned to communicate, whereby the newly assigned user equipment device can measure in a portion of the compressed frame other than said one of the first and second portions of the compressed frame having the fewest user equipment devices assigned to communicate.

2. A method of newly assigning a user equipment device to a compressed frame of a framed communication system, the framed communication system including compressed and non-compressed frames, the user equipment device assigned to communicate throughout a non-compressed frames and only a portion of a compressed frame, the method comprising the steps of:

determining to which portion of a compressed frame a last assigned user equipment device was assigned to communicate in compressed mode; and assigning a new user equipment device to communicate in compressed mode in a portion of the compressed frame different from the portion to which the last assigned user equipment device was assigned, whereby the new user equipment device can communicate in said portion of the compressed frame different from the portion to which the last assigned user equipment device was assigned.

3. The method of newly assigning a user equipment device to a compressed frame of a framed communication system according to claim 2, wherein the portion of the compressed frame to which the last assigned user equipment device was assigned is available to the new user equipment device for making measurements.

* * * * *